Jan. 15, 1935. C. R. BUSCH 1,988,235
EMERGENCY SUPPORTING MEANS FOR BRAKE MECHANISM
Filed Aug. 12, 1933 4 Sheets-Sheet 2
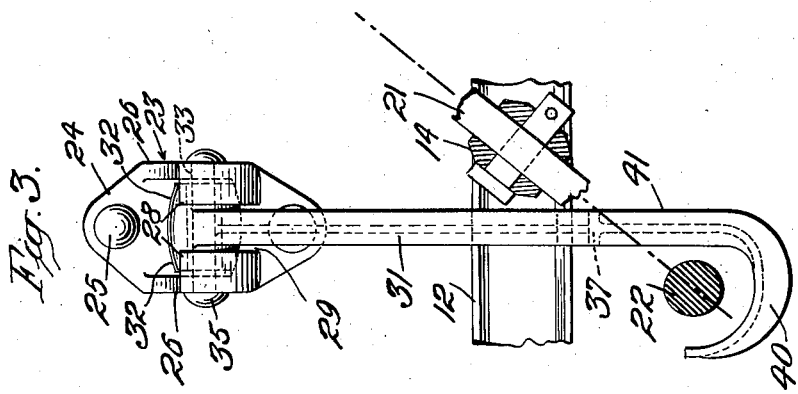
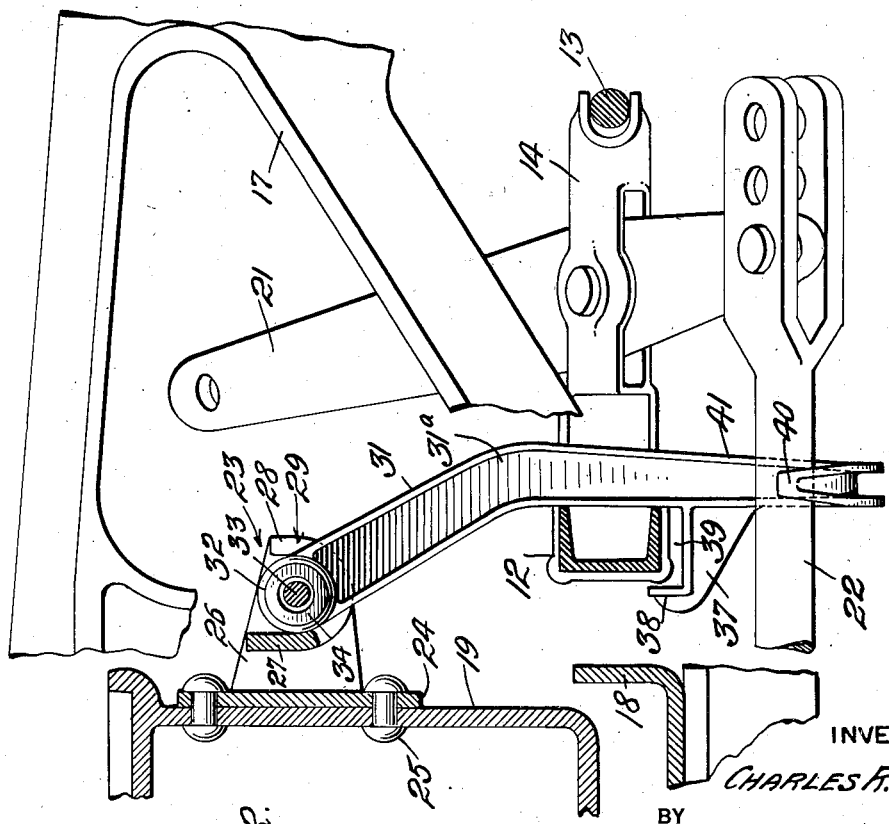
INVENTOR
CHARLES R. BUSCH
BY
Geo. L. Whellock
ATTORNEY

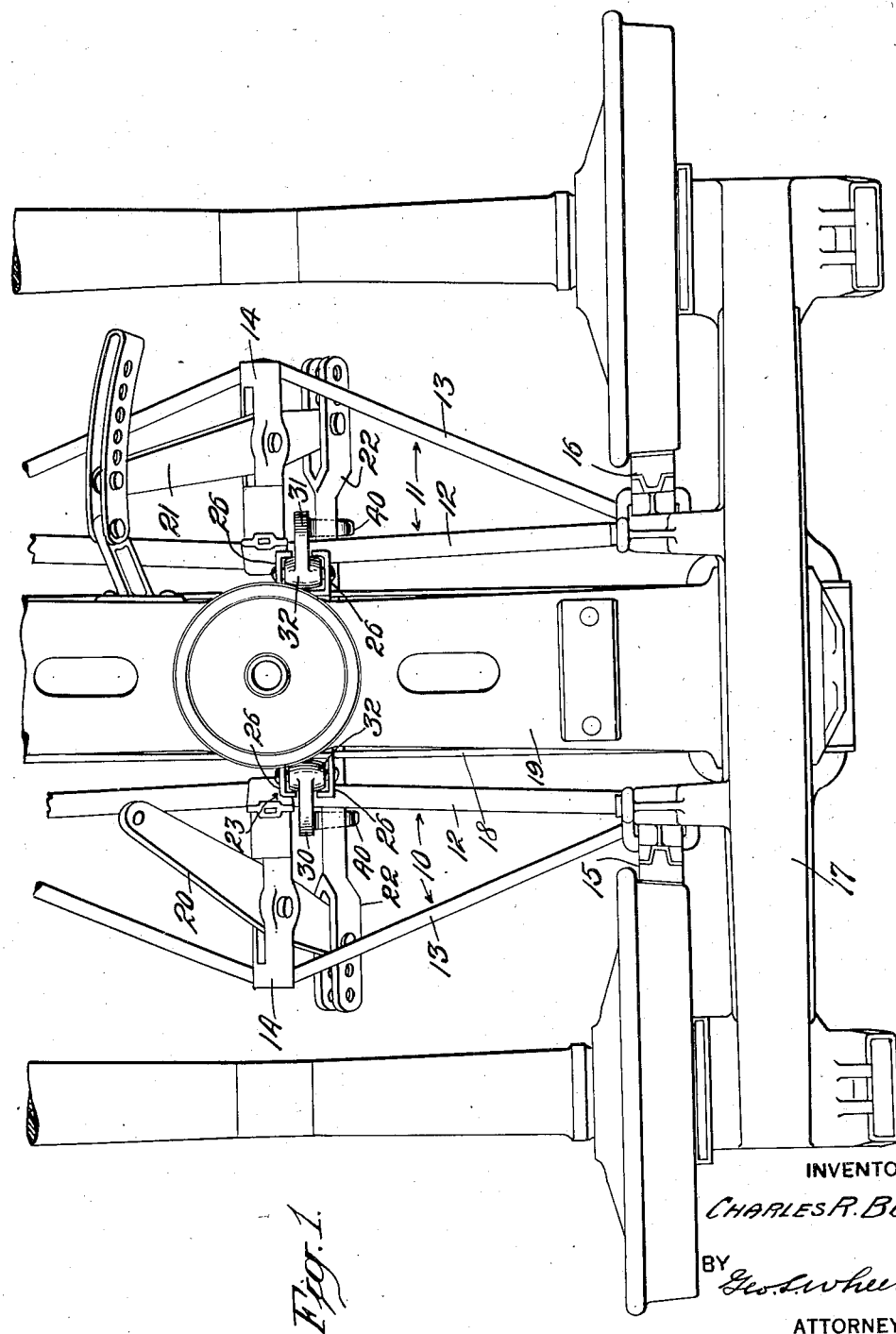

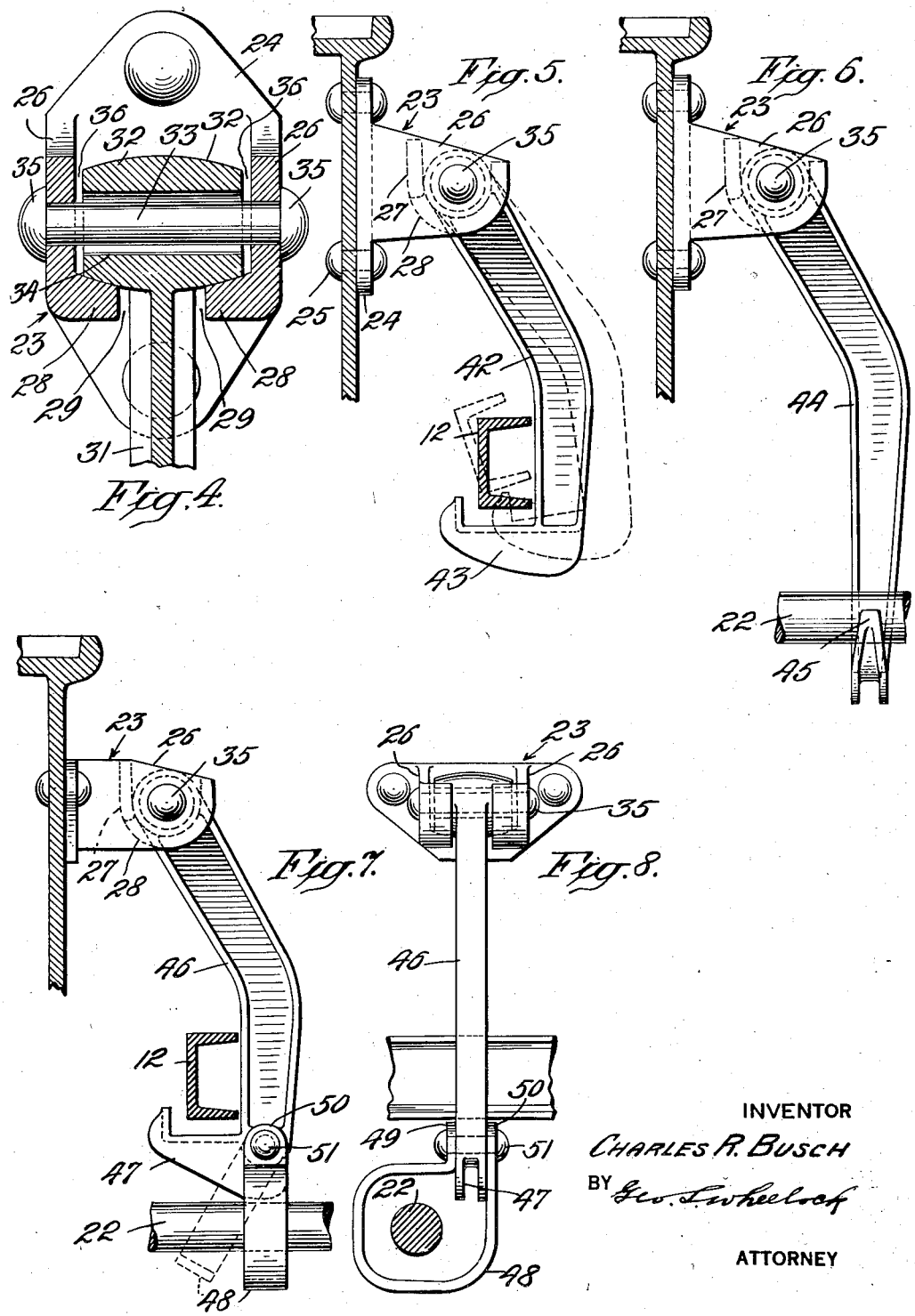

Jan. 15, 1935.　　　　C. R. BUSCH　　　　1,988,235
EMERGENCY SUPPORTING MEANS FOR BRAKE MECHANISM
Filed Aug. 12, 1933　　4 Sheets-Sheet 4
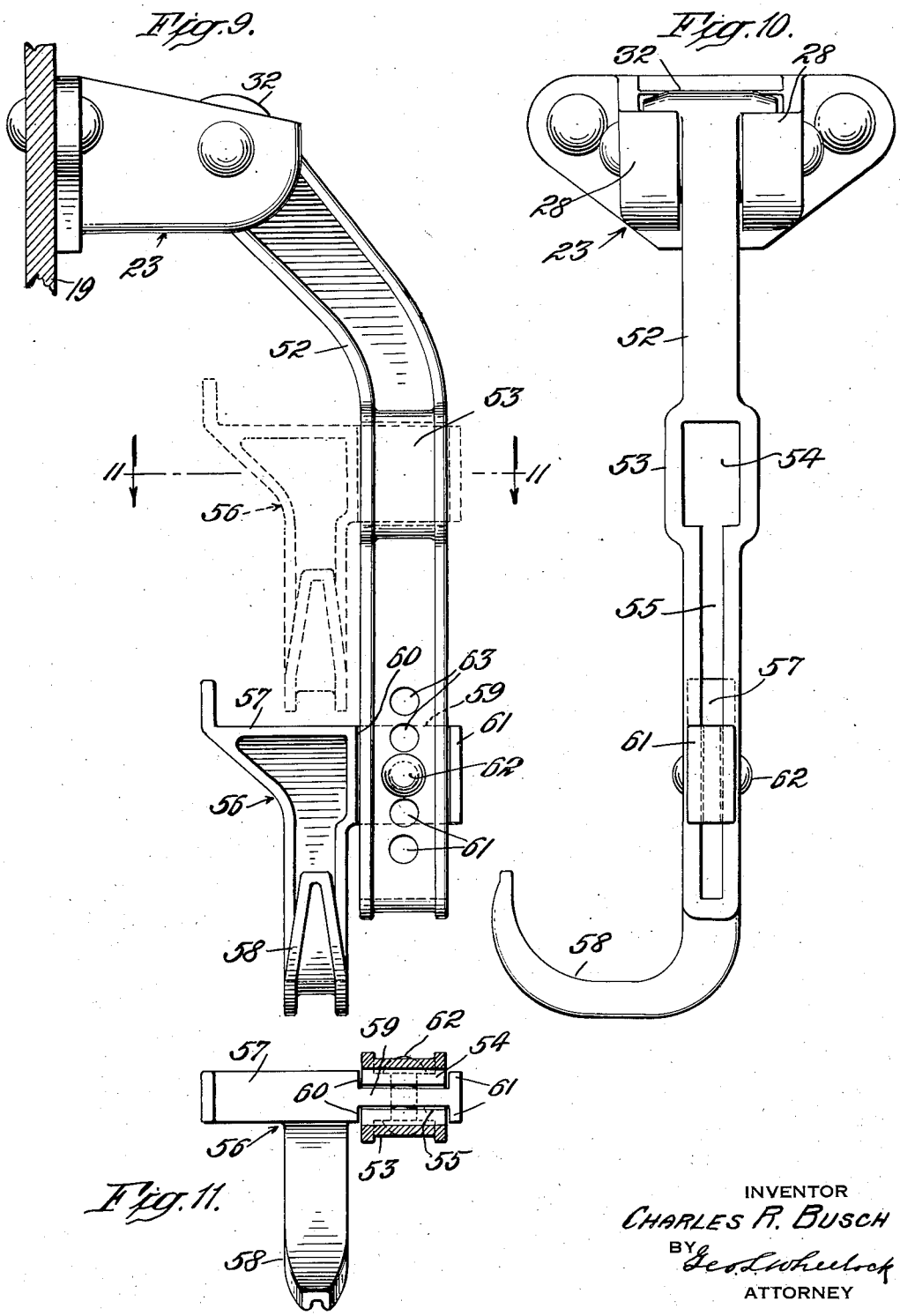
INVENTOR
CHARLES R. BUSCH
BY
Geo. L. Wheelock
ATTORNEY Patented Jan. 15, 1935

1,988,235

UNITED STATES PATENT OFFICE 1,988,235

EMERGENCY SUPPORTING MEANS FOR BRAKE MECHANISM

Charles R. Busch, Orange, N. J., assignor to Buffalo Brake Beam Company, New York, N. Y., a corporation of New York Application August 12, 1933, Serial No. 684,835

36 Claims. (Cl. 188—210)

This invention relates to emergency or safety supporting means for brake mechanism, that is to say means for preventing a part of a brake mechanism, such as a brake beam or a bottom connecting rod, from falling to the track in the event of failure of such a part due to injury thereto or to other parts of the brake mechanism which are relied upon to cause the brake beam or bottom rod or the like to function properly in service. Most of the emergency supports for brake beams or bottom rods are reasonably reliable, while some are very reliable in service, but in the event of failure of a brake beam, bottom rod or concomitant parts, it is not only customary but it is generally required that whenever there is such a failure the mechanics who are making the repairs must not only remove the parts which are damaged or require repair and reconstruction but also remove the emergency or safety supports. After the repairs have been made it often happens that the mechanics do not replace the emergency supports because they may be pushed for time if there is urgent need for the car on which the repairs and replacements have been made. Also in the usual constructions of emergency supports the brake beam and the bottom rod are supported independently of each other, and if there is failure of either the brake beam or the bottom rod it is often necessary to remove both of these as well as their concomitant cooperative parts. Besides there are other objections which prior emergency supports do not overcome entirely.

Therefore, one of the objects of the present invention is to provide emergency or safety supports for brake beams and/or bottom rods which do not have to be removed when making repairs, as the new and novel emergency supports may always remain in position on a car truck, so that it is merely necessary to remove the brake beam or the bottom rod and their concomitant parts, as the case may be, and to make the necessary repairs and replace one or the other or both of them back into functioning position, the improved emergency supports being so mounted and constructed that they can be moved out of the way to drop the brake beam or bottom rod and then when the said members have been reestablished in functioning position it is only necessary to move the supports back into position for upholding the brake beam or the bottom rod, the new emergency supports not being taken down.

Another object of the invention is to provide emergency or safety supports in the form of hangers which can be swung out of the way so as to permit a brake beam, for example, to be dropped by first tilting the same, after which the supports are swung out of the way without requiring their removal, to which end the preferred form of the present invention includes an emergency or safety hanger which is provided with suitable means to interlock with the brake beam and bottom rod and yet to allow of removal of either of these parts without disconnecting the emergency or safety supports from the truck. In all cases of prior constructions the connecting bottom rod is removed to permit the brake beam to be dropped, so that a mechanic who repairs the brake beam must also put back the connecting rod after he does so, while under the present invention it is a very simple matter consuming negligible time for the mechanic to merely move the improved emergency support back to position for sustaining both the brake beam and bottom rod in the event of their failure, as the improved emergency support is always hanging in position ready to be quickly placed back to emergency supporting position.

Another object of the invention preferably resides in an emergency or safety support which makes the same fool-proof as it were, so that a mechanic who has repaired and replaced a brake beam and its concomitant parts will be forced to take the few moments' time required to swing the support back to emergency position for supporting the brake beam and bottom rod.

Another object of the invention is preferably to provide an emergency support or hanger which goes between the strut of the brake beam and the connecting bottom rod, so that when there is lateral movement of the wheels of the truck the assembly, including the brake beam, bottom rod and concomitant parts as well as the emergency supports also sway together, they being retained in their proper cooperative relation.

Another preferred important feature of the invention is to provide an emergency support or hanger which will gravitate back to normal position and release the brake beam when the air brakes are shut off, and hence to prevent sticking of the brake shoes against the wheels of the truck.

Another preferred important object of the invention is to provide an emergency support of such a nature that the brake beam cannot move up, due to the fact that the emergency support is interlocked with the bottom rod which connects the live and dead levers.

The above being among the preferred objects of the present invention, the same consists of certain features of construction and combinations of parts to be hereinafter described and then claimed with reference to the accompanying drawings illustrating a preferred and certain modifications of the invention, and wherein Fig. 1 is a plan of broken away parts of a car truck, showing the preferred interlocking construction;

Fig. 2 is a vertical section and an elevation of parts of a car truck, or so much as is necessary to show the present invention, wherein the improved emergency support or hanger is shown as being interlocked with a brake beam and bottom rod, which in turn are interlocked together;

Fig. 3 is a detail side elevation of the improved support or hanger as viewed from the right of Fig. 2, the brake beam being partially shown and the bottom rod being shown in section;

Fig. 4 is a vertical section through the supporting bracket for the safety support or hanger and through the upper portion of the latter, the lower portion being broken away;

Fig. 5 is a sectional detail, showing in elevation a modified construction of emergency support or hanger, for merely supporting a brake beam in case of its failure;

Fig. 6 is a similar view of another modification showing the emergency support or hanger as constructed for merely supporting a bottom rod in case of its failure;

Fig. 7 is a similar view to Figs. 5 and 6, except that it discloses a modified construction of emergency support or hanger whereby the brake beam and bottom rod are interlocked together;

Fig. 8 is a side elevation, taken from the right of Fig. 7;

Fig. 9 is a side elevation of still another modification;

Fig. 10 is a view taken from the right of Fig. 9; and

Fig. 11 is a section on line 11—11, Fig. 9.

Referring to Figs. 1 to 4 inclusive, brake beams 10, 11 are illustrated each having the usual compression member 12, tension member 13 and strut 14, the brake beams operating on brake shoes 15, 16. A side frame 17 of a truck and a spring plank 18 and a truck bolster 19 are also shown. The live lever 20 and the dead lever 21 are shown as connected by the usual bottom rod 22.

The described parts of the truck and brake mechanism are usual and standard and their consideration will more readily enable the comprehension of the advantages of the present invention in its various applications, but in Figs. 1 to 4 inclusive particularly are illustrated the interlocking feature of the present invention in improved emergency or safety supports or hangers. Upon both sides of the truck bolster 19, brackets, such as 23, are rigidly mounted, although the present invention is not restricted to mounting the improvements upon the truck bolster. Each bracket 23 is provided with a flat base plate 24 which is preferably permanently fixed to the bolster by rivets 25.

Each bracket 23 is provided with side ears or lugs 26, 26 which are side by side and parallel with each other and are cast integral with the base plate 24. A substantially vertical web 27 is cast with the ears or lugs 26, 26, and laterally of the web 27 the projecting ends of the ears 26, 26 are provided at their adjacent inner surfaces with inward flanges 28, 28. These flanges extend in a curve downwardly and upwardly as more clearly shown in Fig. 2 so that the inner surfaces thereof provide seats, these portions of each bracket 23 forming a socket, the said inner surfaces being also slightly rounded transversely of the flanges 28, 28 and having a downward inclination toward the adjacent edges of the flanges, as shown in Fig. 4. Between the edges of the flanges each bracket 23 is provided with a slot 29 which extends from the lower edge of the web 27 to the upper side of the bracket as more clearly shown in Figs. 2, 3 and 4. Each of the brackets 23 is preferably cast in one piece, although the same may be otherwise formed to serve the desired function.

It will be observed that the brackets 23 are supported on the truck bolster or other part of the truck at points considerably upward from the brake beam 10 or 11 and the bottom rod 22. From these so elevated brackets the emergency supports 30, 31 are suspended in the form of hangers, which are additional to the usual and well known brake hangers, Fig. 1, at the ends of the brake beams. The hangers are preferably of elbow shape as shown in Fig. 2, for a reason to be hereafter stated. Each supporting hanger 30, 31 is provided at its upper end with lateral hubs 32 which are formed integrally therewith and in alignment one with the other. These hubs taper towards their outer ends and constitute a knuckle which is peripherally formed circularly and which is also rounded slightly longitudinally complementary to the rounding of the seating surfaces of the flanges 28 which form the socket to receive the knuckle. This construction is more clearly shown in Fig. 4. As the bracket is open at the top between the side ears 26, 26, a large opening is thereby provided to permit the hanger to be inserted downwardly into the slot 29 and the knuckle to be seated downwardly in the socket, whereby to facilitate assembly of such parts. A substantial pin 33 passes through an axial hole 34 in the hubs constituting the knuckle and through the ears 26 of each bracket, the ends of the pin 33 being riveted down against the bracket to provide rivet heads 35, whereby the pin practically constitutes an integral portion of the bracket. When each hanger 30, 31 is mounted in position it will extend downwardly through the slot 29.

Referring again to Fig. 4 it will be observed that the axial hole 34 through the knuckle formed by the hubs 32 is considerably enlarged over the diameter of the pin 33, and that spaces 36 are provided between the ends of the hubs and the adjacent inner walls of the ears or lugs 26. The clearance between the hubs and the ears 26 and between the pin 33 and the hubs is preferably ample so as to permit the joint between each hanger and its supporting bracket to act more or less in the nature of a universal joint, to allow each hanger to swing along each bracket slot 29 and also to swing laterally of such direction of movement, the knuckle formed by the hubs 32 tilting in one direction or the other when the hanger swings laterally. Ample bearing is afforded between the hubs 32 and the inner seating surfaces of the flanges 28, the bearing surfaces being so formed as to allow free swinging in either of the two directions mentioned. Thus each hanger 30, 31 may be said to have a four directional movement, that is in a direction towards the base plate 24 of each bracket, in a direction away from such base plate, in a direction to the left of the position shown in Fig. 4, and in a direction to the right of such position.

It will be seen that the substantial connections provided between each bracket and its hanger will not only permit of the desired movements of the hanger, but will retain the hanger preferably at all times in normal position, inasmuch as it is preferred that the pin 33 be a permanent portion of the bracket. Hence no other means than the preferred knuckle and socket connection shown and described is required in order to hold the hanger against dislodgment from its normal suspended position.

In order to provide the preferred interlock between the brake beam and bottom rod, each hanger 30, 31 is provided with a foot element 37 which extends transversely of and below the pin 33, at a point sufficiently below the brake beam 12, as shown in Fig. 2, so as to support the beam in an emergency. The foot element 37 is provided with a toe 38 so that between the toe and the shank of each hanger a recess 39 is provided which normally receives the lower edge of the brake beam, but which permits the beam to fall thereinto in case of its failure or the failure of concomitant parts. A second foot element 40 is formed integrally with each hanger 31 and extends laterally thereof or at right angles to the direction in which the foot element 37 extends, each hanger having a lower extension 41 on which the foot element 40 is formed. In other words, the foot elements 37 and 40 are arranged on each hanger at an angle to each other of approximately ninety degrees, the foot element 40 being located at a point below the foot element 37 so as to support the bottom rod 22 in an emergency. Each foot element 37, 40 preferably constitutes a sort of stirrup to receive the brake beam or connecting rod, as the case may be in the case of failure, and the foot element 40 may have a hook formation, or may be otherwise formed as will hereinafter appear.

It will be observed more clearly from Fig. 3 that the shank of each hanger passes downwardly between the strut 14 of the brake beam and the bottom rod 22, thus preferably causing each hanger in its entirety to follow the brake beam and concomitant parts in their movement in both the application of the brakes to the wheels and upon release of the brakes, and to follow any lateral movement of the bottom rod, each hanger being preferably in a position to at all times function as a dual safety hanger for the brake beam and the bottom rod, the brake beam and bottom rod being interlocked together. As preferably the improved bracket and safety hanger are permanently mounted on some suitable member of a car truck as to become permanent parts of the truck, all that is necessary is to remove the bottom rod and swing the safety hanger so as to clear the foot element 37 from the brake beam and to drop the beam in the usual way. It will be seen that just as soon as the foot element 37 has been cleared from underneath the brake beam it is only required to first tilt the brake beam, this and the removal of the brake beam being accomplished without removing the hanger. In the event that a bottom rod 22 has to be repaired or to be replaced, that can readily be done without in the least disturbing or changing the relation between the brake beam 12 and the safety hanger.

Referring to Fig. 2 it will be seen that each emergency or safety hanger is preferably of elbow shape to provide an elbow 31a, so that when each hanger is mounted in position its upper end is inclined towards bracket 23, while the lower end below the elbow extends substantially straight downwardly to pass between the compression and tension members of the brake beam. In the preferred construction advantage is taken of this, because the swing of the hanger inwardly or outwardly of the bracket will cause the foot element 40 of the hanger to possibly hit the connecting bottom rod 22, so that the hanger can swing in only a limited range, so that if the brake beam should tend to move upwardly out of the position shown, it will be stopped and prevented from dislocating upwardly by reason of the elbow 31a, and when the hanger gravitates to its normal position, the brake beam will move down to its normal position to be received by the foot element 37 in case of failure of the beam.

Referring to Fig. 5 a modification of the invention is illustrated wherein the hanger 42 is merely provided with a foot element 43 for receiving the brake beam in case of its failure, the downward extension of the hanger and a foot element for a bottom rod being omitted. In other words, the hanger 42 terminates at its lower end in the foot element 43.

Referring to Fig. 6 another modification is illustrated wherein the hanger 44 is merely provided with a foot element 45 for the bottom rod in case of its failure, a foot element for receiving the brake beam being omitted. The length of the hanger 44 is therefore greater than the length of the hanger 42, shown in Fig. 5. In both of these modifications shown in Figs. 5 and 6 the interlocking feature of the invention is omitted.

Referring to Figs. 7 and 8, a modification of the interlocking feature of the preferred form of the invention is shown. In these figures the hanger 46 is terminated at its lower end by a foot element 47 for receiving the brake beam in case of its failure. This hanger 46 and its foot element 47 is similar to the construction shown in Fig. 5. However, in this additional modification the lower end of the hanger 46 supports a foot element 48 in the form of a closed loop which entirely surrounds the bottom rod. This loop may be made of strip steel and bent into substantially the form shown in Fig. 8, the same having opposed terminals 49, 50 to receive the lower end of the hanger 46, through which terminals and the hanger a pivot pin 51 passes, its ends being headed down so that the loop-like foot element may swing on the pivot as indicated in broken lines in Fig. 7. The desirability of such a foot element 48 is clearly set forth and expressed in prior Letters Patent to Seth A. Crone, No. 1,816,639, dated July 28, 1931.

Another modification of the invention is shown in Figs. 9, 10 and 11, wherein the safety hanger 52 is provided between its ends with an enlargement 53 that is provided with a longitudinal aperture 54; which is enlarged laterally relatively to a longitudinal slot 55 which extends along the shank of the hanger to a point adjacent its lower end. This slot 55 and the aperture 54 extend substantially at right angles to the hinge knuckle 32, such as before described supported in the bracket 23 to permit movement of the hanger in the plurality of directions hereinbefore specified.

Mounted upon the safety hanger 52 is a member 56 preferably composed of a casting, or it may be otherwise formed, which member is formed with a foot element 57 and a second foot element 58 below the element 57, the foot elements being disposed at an angle of approximately ninety degrees to each other. The member 56 having the foot elements is formed separately from the hanger 52 and is provided with a tongue 59 in the form of a web, shoulders 60 being formed at opposite sides of the inner end of the web or tongue 59, while lateral shoulders 61 are formed at opposite sides of the other end of the tongue. The shoulders 60 and 61 are arranged parallel with each other and they are spaced apart for a distance but slightly more than the greater dimension of the slot 55, the thickness of the tongue 59 being but slightly less than the least dimension of the slot 55.

To connect the foot member 56 with the safety hanger 52 the shouldered end of the tongue 59 is introduced into the eye or aperture 54 from that side of the hanger which is closest to the point of support, and the member 56 is pushed through the aperture 54 until its tongue or web 59 is in registration with the upper end of the slot 55, whereupon the member 56 is pushed or allowed to gravitate down into the lower end of the slot. When the member 56 is in the desired position, it is held in that position through the medium of a pin 62 which is caused to pass through one of the series of holes 63 in the hanger and through a corresponding hole in the tongue 59. When the pin 62 is in place its ends are preferably upset, so that the member 56 is riveted to the hanger.

The preferred object of the modification shown in Figs. 9, 10 and 11 is to provide safety means which may be mounted on a car truck wherein the brake beam and bottom rod of the brake mechanism has sagged due to wear of the parts of the brake mechanism. In other words, this modified form of the invention is particularly adapted for use in such connection where a car truck is not provided with the improved safety support of the present invention. On referring to Fig. 9 it will be understood that sole reliance is not placed upon the presence of the pin 62 to prevent the brake beam or bottom rod from falling to the track in case of the failure of either one of them, inasmuch as when a brake beam may fall onto the foot element 57 or a bottom rod onto the foot element 58, there is a strong tendency to slightly tilt the member 56 causing the shoulders 60 and 61 to bite upon the opposite surfaces of the safety hanger 52, so that the brake beam or bottom rod is reliably supported until repairs can be made. It will be observed that the member 56 is adjustable either through the medium of a removable locking pin or by removing the riveted pin 62 and substituting another pin and placing it in a different hole in the hanger.

While an important principle of the present invention may be carried out through the use of the different constructions herein shown and described, it will be well at this point to explain with reference to Fig. 5 the manner of use of the improvements as this figure shows the invention in a simple form. In Fig. 5 the compression member 12 of the brake beam is shown, the beam as a whole being constructed along the usual lines such as shown in Fig. 1, having also a tension member 13 and a strut 14. The preferred hanger is suspended from a suitable supporting member at a point above the compression member and passes downwardly close to the same so that its foot element (Fig. 5) is just below the compression member to receive the weight of the beam if it should fall. The downward pull on the hanger would then be on more or less of a straight line from the knuckle or the like whereby the hanger is suspended. As the knuckle is preferably formed as by casting or forging it integrally with the hanger, a substantial support is provided for sustaining the weight of the brake beam. It will be noted that the foot element 43 extends laterally from the hanger and that a dislocated brake beam may be removed from the truck by swinging the hanger away from the compression member sufficiently to permit the brake beam to be removed by tilting the same upwardly with respect to the compression member, whereupon the hanger may be moved further away if necessary, but in any event the brake beam may then be dropped to the track when desired, as the foot element 43 permits the compression and tension members to clear it in lowering the beam to the track. Hence the beam may be removed with hardly any difficulty without removing the hanger. In the preferred construction shown in Figs. 1, 2 and 3 it is desired that but one hanger be employed for each brake beam, in which case the hanger depends between the compression and tension members of the beam at the greatest width of the beam so the lower end of the hanger is in juxtaposition to the bottom rod, making it a very simple matter to swing the hanger to one side and drop a dislocated beam. When the hanger is also provided with a foot element or loop for supporting a bottom rod, the removal of the brake beam is just as easily accomplished and it is only necessary to disengage the bottom rod from its safety supporting foot or loop. In either case the safety hanger is adapted to swing on an arc below its pivotal point of support.

It will be obvious to those skilled in the art that the supporting bracket of the present invention may, if desired, be cast or formed integrally with a main support, such as the truck bolster, instead of being formed separately therefrom, as specifically shown and described. Other changes will of course be obvious as within the scope of the appended claims.

What I claim as new is—

1. In emergency supporting means for brake mechanism, the combination with a supporting member of a car-truck and a bracket fixed rigidly on the member, of an arm forming a safety hanger for supporting a brake-beam or bottom rod in case it drops, and means at the upper end of the arm for swingably mounting the hanger on the bracket for lateral movement in a plurality of different directions.

2. In emergency supporting means for brake mechanism, the combination with a supporting member of a car-truck and a bracket fixed rigidly on the member, of a safety hanger for supporting a brake-beam or bottom rod in case it drops, and a knuckle at one end of the hanger, the bracket having a socket wherein the knuckle is seated for a swinging movement, the bracket being open and left open at the top to permit ready insertion of the knuckle into the socket, and the hanger being swingable in a plurality of different directions.

3. In emergency supporting means for brake mechanism, the combination with a supporting member of a car-truck and a bracket fixed rigidly on the member, of a safety hanger for a brake-beam or bottom rod, and independent thereof, such hanger being additional to the usual brake hangers, and a universal joint connection between the bracket and hanger.

4. In emergency supporting means for brake mechanism, the combination with a supporting member of a car-truck and a one-piece bracket fixed rigidly on the member, of a safety hanger for a brake-beam or bottom rod, and a knuckle integral with one end of the hanger having a circular periphery and tapered and rounded towards both ends, the bracket having a socket more or less complementary to the curvatures of the knuckle, whereby the hanger is adapted to swing in a plurality of different directions.

5. In emergency supporting means for brake mechanism, the combination with a supporting member of a car-truck and a bracket fixed rigidly thereon, the bracket having side ears and a seat, and the seat having a slot parallel with the ears, of a safety hanger for a brake-beam or bottom rod, and a knuckle at one end of the hanger seated in the seat, the hanger extending downwardly through the slot, and a securing pin passing loosely through the knuckle and fixed to the ears, whereby if the pin should fail the hanger will still be supported.

6. In combination, a supporting member of a car-truck, safety supporting means for a brake-beam or bottom rod of brake mechanism, such means being independent of the brake beam or bottom rod and additional to the usual brake hangers, and a universal joint connecting the safety supporting means with the supporting member, permitting swaying movements of the brake mechanism to be transmitted to the safety supporting means.

7. In combination, a supporting member of a car-truck, the longitudinally movable bottom rod of brake mechanism, a safety hanger mounted on the supporting member for movement in a plurality of different directions, and a foot element having a positive location on the lower end of the hanger and located just below the bottom rod for supporting it in case it drops.

8. In combination, a supporting member of a car-truck, and an arm constituting safety supporting means having means for interlocking a brake-beam and bottom rod together at points close to the arm.

9. In combination, a supporting member of a car-truck, and safety supporting means having means for interlocking a brake-beam and bottom rod together and having a movement in a plurality of different directions.

10. In combination, a supporting member of a car-truck, a brake-beam and bottom rod, and movable means supported from such member for interlocking the beam and rod together at adjoining points.

11. In combination, a supporting member of a car-truck, a brake-beam and bottom rod, and means supported from such member and provided with foot elements arranged at adjacent points thereon for the separate support of the beam and rod in case of failure of either.

12. In combination, a supporting member of a car-truck, a brake-beam and bottom rod, and a single hanger supported from such member and provided with foot elements for the separate support of the beam and rod in case of failure of either, the foot-elements being disposed on the hanger at an angle of ninety degrees to each other.

13. In combination, a supporting member of a car-truck, a brake-beam and bottom rod, a safety hanger movably suspended from such member and extending down between the rod and the strut of the beam, and the hanger provided with elements for the separate support of the beam and rod in case of failure of either.

14. In combination, a supporting member of a car-truck, a brake-beam and bottom rod, a safety hanger movably suspended from such member and extending down between the rod and the strut of the beam, and the hanger provided with means for interlocking the beam and rod together.

15. In combination, a supporting member of a car-truck, a brake-beam and bottom rod, and a single hanger constituting means supported from such member and provided with foot elements arranged at adjacent points thereon for the separate support of the beam and rod in case of failure of either, the foot element for the rod being pivoted directly to the lower end of the hanger.

16. In combination, a supporting member of a car-truck, a bottom rod, and a safety hanger pivotally mounted on such member at a point above the plane of action of the brake beam and having a pivoted foot element at its lower end for supporting the rod in case of its failure.

17. In combination, a supporting member of a car-truck, a safety hanger mounted on the supporting member, a foot element adjustable along the hanger adapted to be located just below a brake-beam for supporting the same in case it drops, and means passing through the hanger and foot element for positively attaching them together and positively maintaining the position of the foot element.

18. In combination, a supporting member of a car-truck, a safety hanger mounted on the supporting member, and a foot element vertically adjustable on the lower end of the hanger adapted to be located just below a bottom rod for supporting the same in case it drops.

19. In combination, a supporting member of a car-truck, a safety hanger mounted on the supporting member, and an adjustable member on the hanger provided with means adapted for the independent support of a brake-beam and a bottom rod in case of failure of either of them.

20. In combination, a supporting member of a car-truck, a safety hanger mounted on the supporting member, and an adjustable member on the hanger having thereon foot elements arranged at different levels and adapted for the independent support of a brake-beam and a bottom rod in case of failure of either of them.

21. In combination, a supporting member of a car-truck, a safety hanger mounted on the supporting member, and an adjustable member on the hanger having thereon foot elements each arranged at an angle of approximately ninety degrees to the other and adapted for the independent support of a brake-beam and a bottom rod in case of failure of either of them.

22. In combination, a supporting member of a car-truck, a safety hanger mounted on the supporting member, and means mounted thereon for interlocking a brake-beam and a bottom rod together, such means being adjustable on the hanger.

23. In combination, a supporting member of a car-truck, a safety hanger mounted on the member and having a longitudinal slot and an enlarged aperture terminating the upper end of the slot, and a member provided with a foot element and having a tongue receivable in the aperture, for engagement in the slot, and means for securing the tongue to the hanger.

24. In combination, a supporting member of a car-truck, a safety hanger mounted on the member and having a longitudinal slot, and a member provided with a foot element and having a tongue engaged in the slot, and means for securing the tongue to the hanger.

25. In combination, a supporting member of a car-truck, a brake-beam, a safety hanger suspended from such member at a point above the compression member of the beam and extending downwardly below the same for supporting the beam in case it drops, the hanger having an open top stirrup or foot element which extends underneath the compression member to receive and support the beam in case it drops, and the hanger being provided with a knuckle formed integrally therewith and supporting the hanger from the supporting member so that the hanger is swingable from its point of suspension, whereby the beam may be removed without removing the hanger.

26. In combination, a supporting member of a car-truck, a brake-beam and a bottom rod, a safety hanger suspended from such member at a point above the compression member of the beam and extending downwardly between the compression and tension members of the beam and below the same to a point in juxtaposition to the bottom rod, the hanger having a stirrup or foot element which extends underneath the compression member to support the beam in case it drops and the hanger being swingable from its point of suspension whereby the beam may be removed without removing the hanger.

27. As an article of manufacture, a safety hanger in the form of an arm having means whereby it may be mounted on a car-truck, and means directly thereon adapted to interlock with a brake-beam and bottom rod.

28. As an article of manufacture, a safety hanger in the form of an arm having means whereby it may be mounted on a car-truck, and separate brake-beam and bottom-rod supporting feet directly on the arm.

29. As an article of manufacture, a safety hanger in the form of an arm having means whereby it may be mounted on a car-truck, and separate brake-beam and bottom-rod supporting feet on the arm, the feet being spaced apart along the arm.

30. As an article of manufacture, a safety hanger in the form of an arm having means whereby it may be mounted on a car-truck, and separate brake-beam and bottom-rod supporting feet on the arm, each foot being close to the arm at approximately an angle of ninety degrees to the other foot.

31. As an article of manufacture, a safety hanger in the form of an arm having a knuckle at one end whereby it may be pivotally mounted on a car-truck, and a foot element on the other end of the hanger, and adapted for supporting a bottom rod.

32. As an article of manufacture, a safety hanger in the form of an arm having a knuckle at one end whereby it may be pivotally mounted on a car-truck, and a foot element pivoted on the other end of the hanger, and adapted for supporting a bottom rod.

33. As an article of manufacture, a safety hanger in the form of an arm having means whereby it may be mounted on a car-truck, and separate brake-beam and bottom-rod supporting feet directly on the arm, the bottom rod foot being pivoted to the arm.

34. As an article of manufacture, a safety hanger in the form of an arm having means whereby it may be mounted on a car-truck, a foot element adjustably mounted on the arm and adapted for supporting a member of a brake mechanism, and means passing into the foot element and arm for positively connecting them in a definite relation.

35. As an article of manufacture, a safety hanger having means whereby it may be mounted on a car-truck, and a member mounted adjustably on the hanger and provided with means adapted for the independent support of different parts of a brake mechanism.

36. In combination, a supporting member of a car-truck, an arm constituting a safety hanger mounted on the supporting member for movement in a plurality of different lateral directions, and a foot element rigid with the hanger and having an open top recess, the top opening being of a length somewhat greater than the width of the member of a brake beam which the recess may receive, and the foot element located just below the position of such a beam for supporting the beam in case it drops, such foot element permitting the reception of the beam and free removal of the beam without removing the hanger.

CHARLES R. BUSCH.